March 3, 1970  B. BÖHNKE  3,498,459
APPARATUS FOR BIOLOGICAL TREATMENT OF RAW WASTE WATER
Filed March 24, 1969  2 Sheets-Sheet 1

INVENTOR/S
BOTHO BÖHNKE

BY Melville, Strasser, Foster and Hoffman
ATTORNEYS

March 3, 1970     B. BÖHNKE     3,498,459
APPARATUS FOR BIOLOGICAL TREATMENT OF RAW WASTE WATER
Filed March 24, 1969     2 Sheets-Sheet 2

INVENTOR/S
BOTHO BÖHNKE

BY *Melville, Strasser, Foster and Hoffman*
ATTORNEYS

United States Patent Office 3,498,459
Patented Mar. 3, 1970

3,498,459
APPARATUS FOR BIOLOGICAL TREATMENT OF RAW WASTE WATER
Botho Böhnke, Aachen, Germany, assignor to Lyco Systems, Inc., Williamsport, Pa., a corporation of Pennsylvania
Filed Mar. 24, 1969, Ser. No. 809,680
Claims priority, application Luxembourg, Mar. 22, 1968, 55,749
Int. Cl. B01d 33/00, 23/00
U.S. Cl. 210—208         8 Claims

ABSTRACT OF THE DISCLOSURE

Clarification apparatus for the biological treatment of unclarified waste water, comprising a tank having a lower chamber serving as an anaerobic digestion space and an upper chamber serving as an aerobic activation space, a horizontal bottom wall and a vertical side wall in the tank, the side wall bounding a vertical duct extending upwardly from the lower chamber to the upper zone of the upper chamber, at the upper end of the duct an inflow opening to the upper chamber, and an aeration device arranged in each of the upper chamber and in the upper zone of the lower chamber.

BACKGROUND OF THE INVENTION

A clarification apparatus of the type which is supplied complete and ready for installation and with the aid of which even relatively small amounts of accumulating waste water can be treated biologically, that is, anaerobically and aerobically, is known. Such apparatus finds utility as a sewage disposal system serving up to about 1000 persons. Waste water entering a tank and conducted in the tank into a lower zone constituting the digestion space flows first through the digestion space, in which the anaerobic treatment takes place, and then passes from the upper zone of the digestion space into an upper zone of the activation space, in which the aerobic treatment takes place, from a lower zone of which the waste water flows off through an after-purification chamber. In the lower zone of the activation space there is provided a rotating aeration cylinder with radial bores and a hollow shaft coupled with a drive motor, which draws air through the hollow shaft and introduces it into the waste water in the form of small bubbles. The hollow shaft carries a second aeration cylinder which extends through the bottom wall of the upper chamber. This second aeration cylinder conducts, on the one hand, relatively small amounts of air into the upper zone of the digestion space and, on the other hand, conveys relatively small amounts of waste water out of the activation space together with activated sludge settling on the bottom of the activation space back into the upper zone of the digestion space. Thereby, in the upper zone of the digestion space, from which the waste water flows upward through a vertical duct to the activation space, there is created a continuously self-renewing transition zone with optional treatment, which presents an intermediate stage between the anaerobic and the aerobic treatment, and the excess sludge forming in the activation space is continuously drawn off.

These clarification systems do, to be sure, by reason of the anaerobic and aerobic treatment of the waste water, lead to a considerably greater degree of purification than the usual multichamber digestion trenches hitherto used, especially in the case of sewage disposal systems for relatively small numbers of persons, but they do not yet meet the high requirements of a complete biological purification, which demands an extremely high degree of purification. This is due, as was found, essentially to the fact that the flow speed of the waste water in the activation space, mainly in the circumferential direction, is very low and that in consequence of the excessively low speed of flow the activated sludge is not optimally intermixed with the waste water, but settles at the bottom of the activation space. The atmospheric oxygen introduced, to be sure, in sufficient amounts into the activation space is, therefore, only partially utilized, and there can even occur on the bottom of the activation space, on which the predominant portion of the activated sludge collects, an inadequate oxygen supply for the bacterial substance.

SUMMARY OF THE INVENTION

This invention remedies the aforementioned defects of known clarification systems and provides a clarification apparatus of the type mentioned earlier in such a way that there occurs a considerable heightening of the degree of purification and a complete biological purification effect is achieved.

This problem is solved according to the invention primarily by the provision of an aeration device comprising a rotor rotating at the water surface in the upper chamber with the axis of rotation lying substantially in the perpendicular center line of the upper chamber and a second rotor arranged under the bottom wall of the upper chamber on the same shaft, as well as of a conduit issuing into the effective zone of the second rotor for the supply of air by means of an aeration pump arranged outside the tank.

Preferably the clarification apparatus is constructed in such a way that, in a manner known per se, on the underside of the bottom wall of the upper chamber there is arranged a vertical guide wall extending into the lower chamber and shielding its upper zone against the vertical duct, and this guide wall is provided with apertures which are arranged for the generation of an air cushion under the bottom wall at a distance under the bottom wall. This spacing amounts preferably to at least 4 cm.

With the aid of the rotor of the upper chamber, which acts in a manner known per se as a rotary pump wheel on the waste water surface, there is generated, besides a circulating flow of the waste water in the upper chamber in a vertical direction, primarily a high flow speed of the waste water in the circumferential direction of the upper chamber, whereby the activated sludge is set in turbulence, distributed in the waste water and maintained in suspension, and whereby a sufficient oxygen introduction into the waste water is effected and, accordingly, an intensive subjection of the activated sludge to oxygen. In this manner there is achieved a significantly heightened purifying effect with a high degree of efficiency fulfilling the requirements of a complete biological purification. The rotor arranged under the bottom wall of the upper chamber rotates the water volume in a flow movement circling about the vertical central axis and distributes the air supplied from a separate aeration pump or from an aeration pump driven directly with the rotor drive shaft into extemely fine bubbles; it thereby brings about a high oxygen introduction in the upper zone of the lower chamber and thus, in comparison to prior art optional treatment, an advantageous transition to the aerobic treatment of the waste water. The air introduced is accumulated by the guide wall into an air cushion under the bottom wall and through the apertures arranged in the guide wall deliberately released periodically into the inlet shaft, in which process the air bubbles rising at intervals prevent any accumulation of floating sludge.

An efficient and advantageous embodiment of the entire aeration device consists in arranging the rotor turning in the upper chamber and the rotor turning in the lower chamber on a common shaft and providing a cover plate for the tank bearing the upper shaft bearing and a removable part of the bottom wall of the upper chamber bearing the lower shaft bearing connected with one another by means of a plurality of rods, one of the rods being a tube acting as an air feed line to the lower rotor.

Preferably a guide plate is arranged in the lower chamber at about half the height of the digestion space. This guide plate limits the turbulence generated by the rotor to the upper zone of the digestion space and keeps the excess sludge given off from the activation space as long as possible in the upper zone.

Expediently the tank and its chambers are made cylindrical in order, in particular, to keep as low as possible the drive energy requirements of the rotor.

The waste water treated anaerobically in the lower chamber and thereupon in the optional zone, which when separated from the inflowing unclarified waste water rises in the duct to the upper zone of the upper chamber, flows through an inlet opening in the side wall thereof into the upper chamber. According to a further preferred feature of the invention the side wall is provided, in the zone of the duct communicating with the inlet opening and spaced from the inlet opening, with a reflux opening which has its lower edge about at the normal level of the water surface in the tank and is adjustable in height and width by a diaphragm slidable horizontally and vertically from its lower edge and one side edge. The excess sludge arising in the activation process is conducted through this reflux opening by wave impact into the duct and passes downwardly into the optional zone of the lower chamber, where its still present activity is utilized. Here, only waste water surges caused by wave impact over the lower edge of the reflux opening can pass into the duct, and by means of the diaphragm, the overflowing waste water surge can be influenced and regulated in such a way that the removal of activated slude corresponds to the increase in activated sludge. Thereby there is provided automatically a constant activated sludge content, which can be adjusted to the prevailing organic load.

BRIEF DESCRIPTION OF THE DRAWING

Further features of the invention are apparent from the accompanying drawings, wherein.

DESCRIPTION OF THE PREFERRED EMBODIMENT

Figure 1:
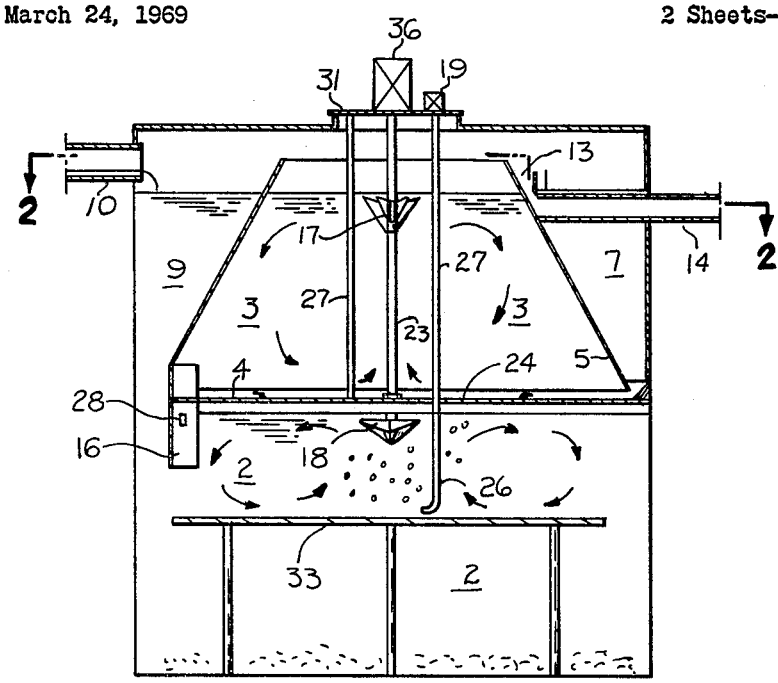
FIG. 1 shows an exemplary embodiment of a clarification apparatus in vertical section.
Figure 2:
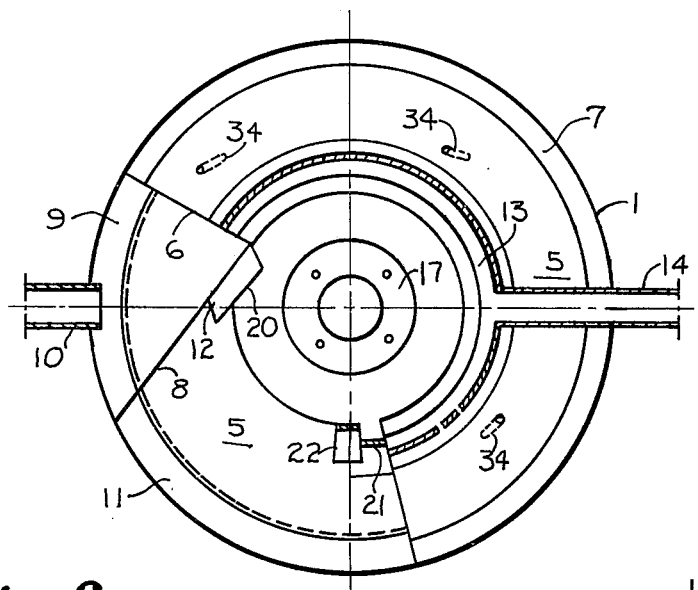
FIG. 2 shows a horizontal section through the clarification apparatus along the line 2—2 of FIG. 1.

Referring to FIGURES 1 and 2, cylindrical tank 1 of the clarification apparatus has a lower chamber 2 as a digestion space and an upper chamber 3 as an activtion space. The upper chamber 3 is formed by a horizontal bottom wall 4 and by a side wall 5 positioned above the bottom wall 4, the side wall 5 being of truncated-conical form. Over about half the tank circumference, the bottom wall 4 is spaced from the tank wall, and the annular space between the tank wall and the side wall 5 is subdivided by two vertical walls 6 into a postpurification chamber 7 closed off by the bottom wall 4 and a duct open at the bottom to the lower chamber 2. This shaft is further subdivided by a vertical partition 8 into an inflow duct 9, which connects waste water feed 10 of the tank 1 downwardly with the lower chamber 2, and into a transfer duct 11 which leads upwardly and connects the upper zone of the lower chamber 2 with the upper zone of the upper chamber 3, where the side wall 5 of the upper chamber 3 is provided with an inflow opening 12. In the zone of the after-purification chamber 7 the side wall 5 is spaced above the bottom wall 4, whereby the lower zone of the upper chamber 3 and the after-purification chamber 7 communicate with one another. In the after-purification chamber 7 the side wall 5 has an overflow gutter 13, to which there is connected a waste water discharge 14. The unclarified waste water flowing in through the waste water feed 10 is directed by a guide plate 16 arranged on the underside of the bottom wall 4 in the feed duct 9 into the lower zone of the lower chamber 2. From the upper zone of the lower chamber 2 the waste water passes through the transfer duct 11 and the inflow opening 12 into the upper zone of the upper chamber 3. From the lower zone of the upper chamber 3 the waste water passes into the after-purification chamber 7. From the after-purification chamber 7 the water passes into the overflow gutter 13 and to the waste water discharge 14.

In the tank 1 there is disposed an aeration device which provides two rotors on a drive shaft 23. The rotor 17 sets the water content of the upper chamber 3 into a circulatory movement along the side wall 5, while the rotor 18 rotating under the bottom wall 4 distributes the air from an aeration pump 19 which is arranged outside the tank and is driven separately or directly by the rotor shaft, fed in through a conduit 26 in fine bubbles in the lower chamber 2 and likewise brings about a circulating movement of the water content.

The inflow opening 12 in the side wall 5 lies about at the height of the normal water level in the tank, or may be angled to lie partly above and partly below the water level. On its inside the side wall 5 is provided with a tongue 20 extending below the water level, which is angularly set in the horizontal flow direction of the waste water circling in the upper chamber 3 along the side wall 5 ahead of the inflow opening 12 on the side wall 5 and extends, projecting at an acute angle from the side wall 5, on the upstream side of the inflow opening 12. The tongue 20 exerts an ejector action on the water flowing past, whereby floating sludge rising in the transfer duct 11 is likewise drawn through the inflow opening 12 into the upper chamber 3. The partition 8 borders near the downstream side of the inflow opening 12 facing the waste water feed 10 on the outside of the side wall 5 and thereby favors the process of drawing off of floating sludge. The side wall 5 is further provided in the zone of the transfer shaft 11, and spaced away from the inflow opening 12, with a reflux opening 21, which lies with its lower edge at or somewhat above the normal water level in the tank and is adjustable by a diaphragm or slide 22 movable horizontally and vertically proceeding from its lower edge and one side edge, as to its open diameter. Through the reflux opening 21, waste water surges evoked by wave impact in chamber 3 can pass over with activated sludge into the transfer shaft 11, from which the activated sludge present in excess falls into the optional zone of the lower chamber 2. The amount of waste water passing over, and hence the amount of excess sludge, is controllable by the diaphragm 22.

At about half the height of the lower chamber 2 there is arranged under the rotor 18 a horizontal guide plate 33. This restricts the movement impulse effected by the rotor 18 to the upper zone of chamber 2, which forms the optional zone, and keeps the activated sludge which has passed over through the reflux opening 21 securely in this zone as long as possible.

Figure 3:
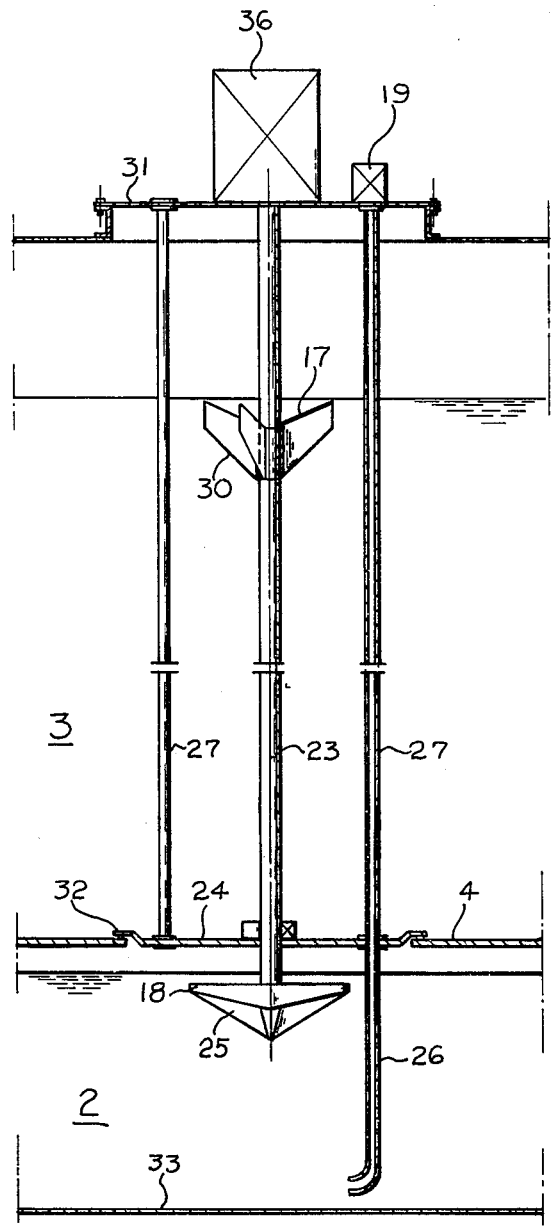
FIG. 3 shows an aeration device of the clarification apparatus on an enlarged scale.

FIG. 3 shows an embodiment of the aeration device, which comprises two rotors 17 and 18 arranged on shaft 23 driven at a low speed of about 60 to 80 r.p.m. The lower rotor 18 is seated on the end of the shaft 23 bearingly conducted through a removable closure plate 24 of the bottom wall 4. The upper end of the shaft 23 is borne in a cover plate 31 of the tank 1, which carries the motor 36 and the aeration pump 19. Cover plate 31 and closure plate 24 are connected with one another by a plurality of rods 27. The rotor 17 of the upper chamber 3 consists of radially extending blades 30 immersed in the waste water, which bring about an intense flowing movement of the waste water in the circumferential direction and stir up the waste water vigorously at the surface, thereby accelerating the oxygen absorption of the waste water. The rotor 18 of the lower chamber 2 has on its underside radially extending ribs 25, whereby there is generated in chamber 2 a flow movement in the circumferential direction. An air line 26, connected through one of the rods 27 which is hollow with pump 19, ends under the rotor 18 beneath the closure plate 24 and conducts relatively small amounts of air in from outside the tank, the oxygen content of which, because of the fine-bubble distribution by the rotor 18 and because of the repeated impacts of the air retained under the bottom plate 4, is very efficiently utilized and satisfies the oxygen requirement in the optional transition zone. The introduced air is prevented by the guide wall 16 (FIG. 1) from escaping immediately from the chamber 2, and it is only after reaching a certain layer thickness fixed by the upper edge of one or more apertures 28 provided in the guide wall 16 that it can escape through the guide wall 16 into duct 9. The air bubbles bursting periodically at the water surface in the feed duct 9 break up possible formations of floating sludge. Since the lower rotor 18 serves only for the introduction of air into the optional transition zone and not for the returning of excess activated sludge from the upper chamber into the lower chamber—because this return, as already described, takes place more advantageously and with better possibility of regulation with the aid of the adjustable reflux opening 21—it is possible to dispense with the pump rotor of the prior art clarification systems for the return of sludge into the digestion space 2.

The two rotors 17 and 18 and their shaft 23, the upper cover plate 31 and the closure plate 24 closing the opening in the bottom wall 4 by means of a rubber gasket 32, are connected by the rod system 27 into a unit which can easily be installed or removed.

The flow movement in the upper chamber 3 along the side wall 5 is used for the return of sludge from the after-purification chamber 7 by the provision, at a certain depth under the water level, of a plurality of tubes 34 passing tangentially through the side wall 5, which are immersed in the flow and act as ejectors.

The embodiments of the invention in which an exclusive property or privilege is claimed are defined as follows:

1. In clarification apparatus for the biological treatment of raw waste water, comprising a tank having a lower chamber acting as a digestion space and an upper chamber acting as an activation space, a substantilly horizontal wall defining the bottom of said upper chamber, a substantially vertical side wall in said upper chamber, said side wall bounding a vertical duct extending upwardly from the lower chamber to an upper zone of the upper chamber, an inflow opening to the upper chamber in said side wall at the upper end of the duct, an inlet to said tank, an outlet from said tank, and an aeration device arranged in each of the upper chamber and in the upper zone of the lower chamber, the improvement which comprises: said aeration device including a rotor rotating in the upper chamber at the surface of the water around an axis of rotation lying substantially in the vertical center line of said upper chamber, a second rotor disposed under the bottom wall of said upper chamber and mounted on a shaft common to said rotors, and a supply line terminating in the zone of action of said second rotor for the supply of air thereto by means of an aeration pump disposed outside said tank.

2. The apparatus of claim 1, wherein a guide wall is positioned on the underside of said bottom wall of the upper chamber, said guide wall extending vertically into said lower chamber and shielding the upper zone thereof against said duct, said guide wall being provided with at least one aperture positioned at a distance below said bottom wall sufficient to generate an air cushion under said bottom wall.

3. The apparatus of claim 1, wherein said aeration device includes a cover plate seating a bearing for the upper end of said common shaft, a removable part of said bottom wall of said upper chamber, said removable part carrying a bearing for the lower part of said common shaft, and a plurality of rods interconnecting said cover plate and said removable part, one of said rods being hollow and constituting said air supply line to said second rotor.

4. The apparatus of claim 1, including a horizontal plate positioned under said second rotor at about half the height of said lower chamber.

5. The apparatus of claim 1, wherein said duct is divided by a vertical partition into a feed duct which communicates said inlet to said tank in a downward direction with said lower chamber and a transfer duct which connects said lower chamber with said inflow opening in said side wall at the upper zone of said upper chamber.

6. The apparatus of claim 5, including a reflux opening in said side wall in the zone of said transfer duct, said reflux opening being spaced from said inflow opening and having its lower edge about at the height of the normal water level in said tank, and a diaphragm slidable horizontally and vertically proceeding from its lower edge and one side edge for adjustment of the open diameter of said reflux opening.

7. The apparatus of claim 5, wherein said inflow opening in the side wall of said upper chamber extends partly above and partly under the normal water level in said tank, and including a tongue attached to the inside of said side wall extending below the water level, said tongue being angularly set in the horizontal flow direction of circulating waste water in the upper chamber on the upstream side of said inflow opening and extending at an acute angle from said side wall so as to project ahead of said inflow opening, said vertical partition bordering adjacent said inflow opening on the downstream side thereof on the outside of said side wall at an acute angle thereto.

8. The apparatus of claim 1, including a post-purification chamber surrounding a part of the circumference of said upper chamber remote from said inlet to said tank and in annular relation to said upper chamber, said side wall being spaced from said bottom wall in the area surrounded by said post-purification chamber whereby the lower zone thereof communicates with the lower zone of said upper chamber, and further including ejector tubes positioned beneath the water level penetrating said side wall tangentially and extending into the flow within said upper chamber in the area surrounded by said post-purification chamber.

References Cited

UNITED STATES PATENTS 2,509,683   5/1950   Green _____ 210—208 X
2,573,941   11/1951  Walker et al. _____ 210—208 X JAMES L. DECESARE, Primary Examiner U.S. Cl. X.R.
210—220